United States Patent [19]
Richardson, Jr.

[11] Patent Number: 5,435,274
[45] Date of Patent: Jul. 25, 1995

[54] ELECTRICAL POWER GENERATION WITHOUT HARMFUL EMISSIONS

[76] Inventor: William H. Richardson, Jr., 1496 Giles St., Palm Bay, Fla. 32907

[21] Appl. No.: 162,342

[22] Filed: Dec. 2, 1993

Related U.S. Application Data

[63] Continuation-in-part of Ser. No. 854,938, Mar. 20, 1992, which is a continuation-in-part of Ser. No. 613,094, Nov. 15, 1990, abandoned.

[51] Int. Cl.6 ............................................. F02B 43/08
[52] U.S. Cl. .................................. 123/3; 123/DIG. 12
[58] Field of Search ............................ 123/3, DIG. 12

[56] References Cited

U.S. PATENT DOCUMENTS

| | | | |
|---|---|---|---|
| 3,648,668 | 3/1972 | Pacheco | 123/3 |
| 3,946,711 | 3/1976 | Wigal | 123/DIG. 12 |
| 4,003,344 | 1/1977 | Bradley | 123/3 |
| 4,085,709 | 4/1978 | Tangri | 123/DIG. 12 |
| 4,271,793 | 6/1981 | Valdespino | 123/DIG. 12 |
| 4,344,831 | 8/1982 | Weber | 123/DIG. 12 |
| 4,369,737 | 1/1983 | Sanders et al. | 123/DIG. 12 |
| 4,442,801 | 4/1984 | Glynn et al. | 123/DIG. 12 |
| 4,520,764 | 6/1985 | Ozawa et al. | 123/DIG. 12 |
| 4,702,894 | 10/1987 | Cornish | 123/DIG. 12 |
| 5,007,381 | 4/1991 | Kakegawa et al. | 123/DIG. 12 |
| 5,159,900 | 11/1992 | Dammann | 123/3 |

Primary Examiner—Henry C. Yuen
Assistant Examiner—Erick Solis
Attorney, Agent, or Firm—Charles A. McClure

[57] ABSTRACT

Method of generating electrical power without emission of harmful substances from combustion of a water-derived fuel gas mixture. An underwater carbon arc operated in the absence of hydrocarbons results in a mixture of gases, being non-self-combustible but combustible as a fuel gas in the presence of air, and comprising gaseous hydrogen in major amount and carbon oxides in minor amount, mainly carbon monoxide. The fuel gas is adapted, along with air, to run an internal combustion engine driving an electrical generator and so to provide useful electrical power without the harmful emissions usual in combustion of fossil fuels.

12 Claims, 3 Drawing Sheets

ELECTRICAL POWER GENERATION WITHOUT HARMFUL EMISSIONS

This is a continuation-in-part of my patent application Ser. No. 07/854,938 filed 20 Mar. 1992, which is incorporated herein by reference, and which was a continuation-in-part of my now abandoned patent application Ser. No. 07/613,094 filed 15 Nov. 1990.

TECHNICAL FIELD

This invention relates to the generation of electrical power without production of harmful emissions encountered in conventional generation of electrical power from fossil fuel combustion.

BACKGROUND OF THE INVENTION

At suitable geographical sites, generation of electrical power can be accomplished-more or less economically—by converting energy available from stream-collected rainfall, tidal, or solar sources, substantially free of harmful emissions. More usually, electrical power is generated through combustion of fossil fuels, whether in gaseous, liquid, or solid form (e.g., natural gas, gasoline, coal), but such fuel combustion is accompanied by harmful emissions, also in gaseous, liquid, or solid form (e.g., nitrogen oxides, sulfurous acid, carbonaceous particulates). Carbon monoxide, often present as a harmful emission in the effluent from combustion of a fossil fuel, is so readily oxidizable that—when a fuel—it converts readily and substantially completely to harmless carbon dioxide upon combustion.

Incompletely combusted carbonaceous fragments or fossil fuel combustion by-products—whether gaseous, liquid, or solid—can be directly injurious to health of humans and other living creatures, as when breathed or ingested in or with food, and can be indirectly deleterious, as by altering characteristics of the biosphere upon which all living creatures depend. Polluting emissions from fossil-fueled factories and vehicles supplement those from electrical power plants, so there is an extreme need for both stationary and mobile power generation by alternative fuels whose combustion does not emit harmful gases, liquids, or solids. Combustion products considered harmless (as compared with aforementioned or other harmful examples) are notably carbon dioxide (gaseous) and water (gaseous or liquid).

Hydrogen, which has long been considered likely to be an ideal fuel because it converts completely to water in ordinary air combustion, is not satisfactory as fuel for internal combustion engines because it heats intake valves so hot that pre-ignition flashback occurs ahead of the combustion chamber, forming harmful nitrogen oxides then exhausted as emissions. See, to this effect, *HYDROGEN STORAGE AND UTILIZATION IN TRANSPORTATION VEHICLES—SUMMARY*, which was published in 1988 by the Alternative Fuels Utilization Program of the Office of Transportation Systems in the U.S. Department of Energy, including citation of other pertinent references.

SUMMARY OF THE INVENTION

A primary object of the present invention is electrical power generation without producing harmful emissions in the process.

Another object of this invention is to drive electrical generating equipment by motive means energized by air combustion of fuel without producing harmful gaseous, liquid, or solid emissions.

A further object of the invention is to generate, on-site, an electrical generator fuel free of harmful emissions when combusted.

Yet another object of this invention is to do the foregoing at either stationary or mobile electrical power generation sites.

A still further object of the invention is to save money while generating electrical power from fuel free of harmful emissions.

In general, the objects of the present invention are attained by running motive means, such as an internal combustion engine, on fuel comprising in major part hydrogen and in substantial minor part carbon monoxide so as to drive an electrical generator therewith.

More particularly the fuel comprises about five to seven tenths hydrogen and about two to three tenths carbon monoxide. Only added air is required to combust the mixture to water and carbon dioxide. Internal combustion engines so fueled operate normally and are free of the polluting emissions from fossil-fueled electrical generation.

The fuel is derived from electrical carbon arcing under water. The negative voltage coefficient of resistance characteristic of an arc ensures that, once struck, the arc persists at negligible power consumption—and, provided with carbon, can be maintained by a fraction of the output of the generator driven by an engine so fueled.

Other objects of the present invention, together with means and methods for attaining the various objects, will become apparent from the following description and an accompanying diagram of a preferred embodiment, presented here by way of example rather than limitation.

DESCRIPTION OF THE INVENTION

Figure 1:
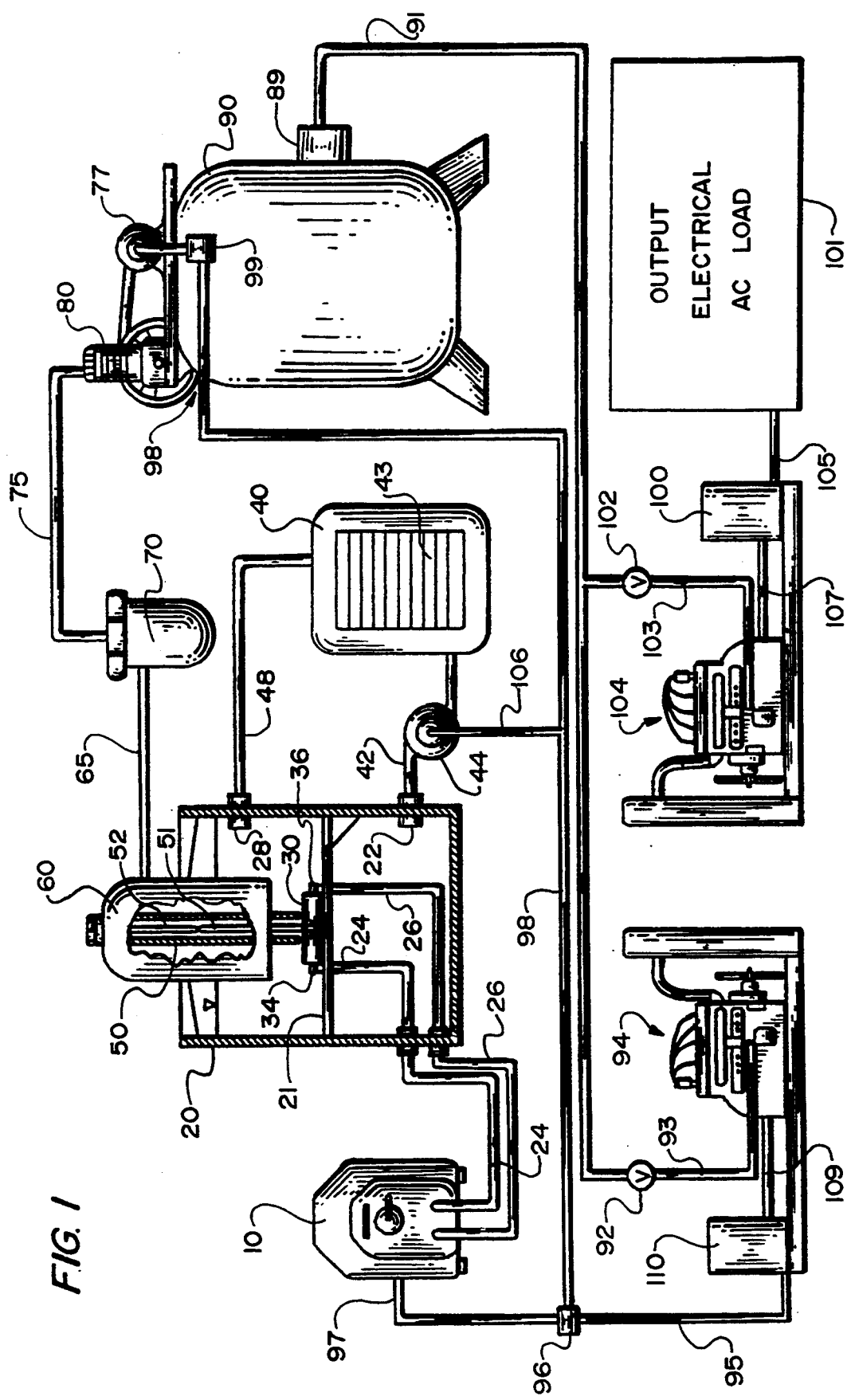
FIG. 1 is a schematic diagram of an exemplary embodiment of the electrical power generation apparatus of this invention, including related fuel-producing equipment.

FIG. 1 features welder 10 as a high-current electrical power source suitable for striking an underwater carbon arc in open-top reactor 20. Pair of electrical leads 24, 26 go from the welder to and through the sidewall of the reactor and connect at terminals 34, 36 across block electrode assembly 30 supported level on partition 21. Reactor 20 contains water (dashes) to a level (triangle) covering not only the electrode assembly but also outlet 22 (near bottom) to water line 42 containing filter/pump 44 and leading to heat exchanger 40 (mostly hidden behind louvers 43) and back to inlet 28 (near top) at the end of return line 48 from the heat exchanger.

Open-top magazine 50 and surrounding closed-top gas collection hood 60, suitably supported, extend downward into the reactor from and terminate (open downward) under water just above block electrode assembly 30. Carbon rods 51 and 52, aligned upright within the magazine, are centered above the electrode assembly, with the bottom end of the first rod bridging the narrow edges of the respective electrodes (shown later) and with the bottom end of the second rod resting on the top end of the first rod. Gas fuel takeoff line 65 connects the interior of hood 60 to filter 70, from which gas collection line 75 connects to storage tank 90 via compressor 80 driven by motor 77, both located on top of the storage tank.

The rest of FIG. 1 shows pressurized fuel tank outlet valve 89 at the right, connecting the tank through valve 92 to fuel line 91. This fuel line connects via branch lines 93 and 103, containing respective valves 92 and 102, to motive means in the form of pair of internal combustion engine assemblies 94 and 104. Shaft 109 from engine 94 connects to generator 110 (shown in block form), whereas shaft 107 connects to similarly shown generator 100 by shaft 107.

Pair of output electrical leads 95 from left generator 110 go to multi-position junction switch 96, from which separately switched (i) pair of leads 97 go to welder 10, and (ii) pair of leads 98 go to compressor 77 via pressure-switch junction 99 and (iii) by branch leads 106 to circulating pump 44. These leads conduct DC or single-phase AC power, as most appropriate for the intended internal uses. Trio of output leads 105 from right generator 100 conduct three-phase power to block 101 designated as Output Electrical AC Load. The respective engines and their associated generators may take the well known compact form of motor-generator assemblies; alternative motive means may include burners and/or boilers heated by combustion of the fuel, plus engines actuated by the burning gases or by steam.

Figure 2:
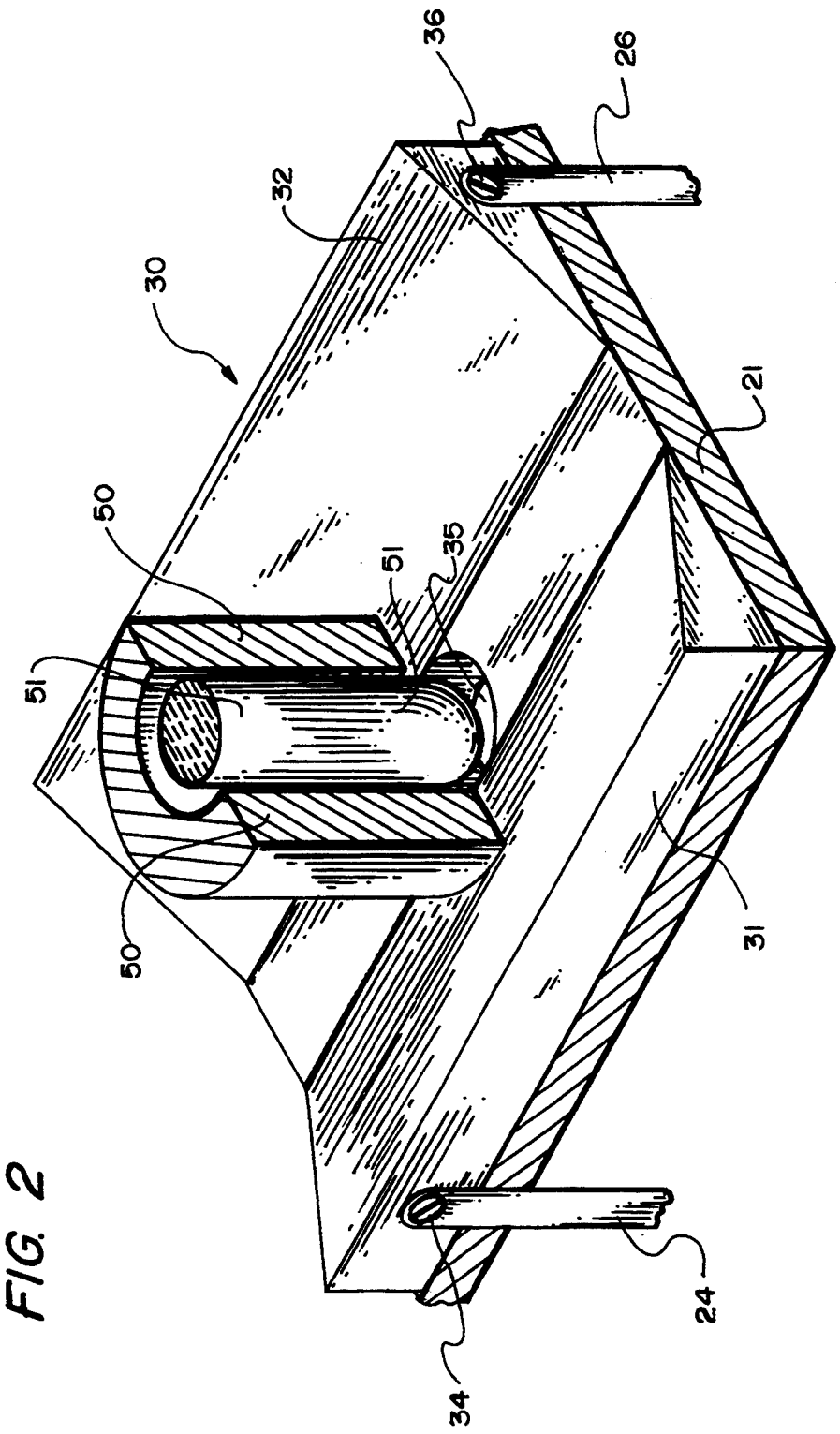
FIG. 2 is a fragmentary perspective view, on an enlarged scale, of the carbon arc and vicinity in the same apparatus.

FIG. 2 shows fragmentarily, in perspective, block electrode assembly 30 on partition 21 of the reactor (as in FIG. 1 but larger). Central opening 35 in the compartment is as wide as the spacing between the narrow edges of respective wedge-shaped electrodes 31, 32. The rounded lower end of rod 51 is nearing the opening, which it will bridge as the arc is struck across the electrodes and through it when power is applied across the electrodes at terminals 34, 36. Water is omitted as unnecessary to an understanding of this view, but it will be understood to be present, with the further understanding that an arc struck between the underwater carbon electrodes and through the carbon rod heats the water drastically and decomposes it into constituent hydrogen and oxygen and also that the oxygen reacts with carbon to produce gaseous carbon monoxide and carbon dioxide. The next view will aid understanding of the ensuing procedure, both the steps giving rise to the fuel production, and the subsequent steps of converting the fuel with air into output electrical energy.

Figure 3:
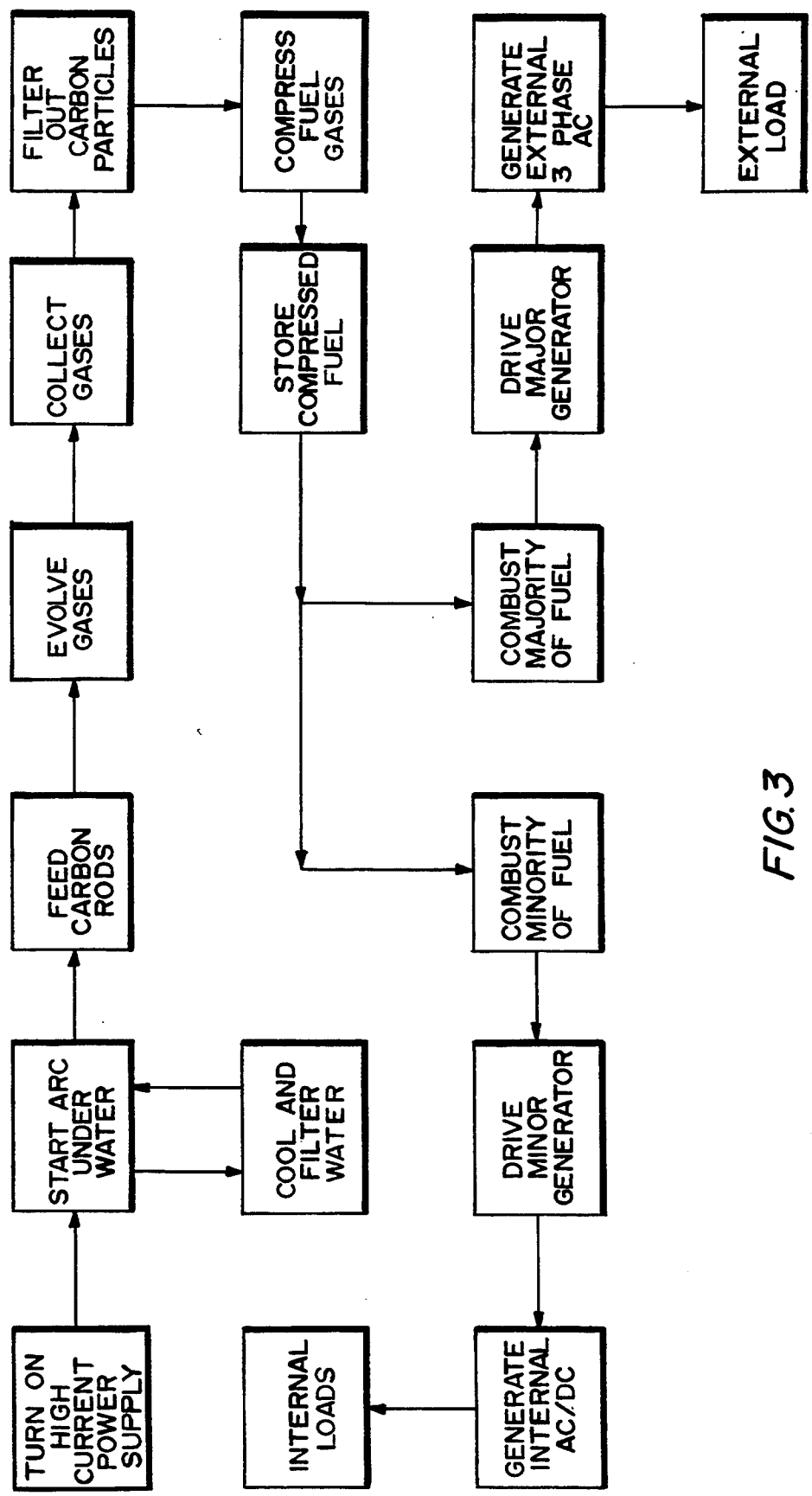
FIG. 3 is a schematic block diagram of production of the fuel and generation of electrical power therefrom.

FIG. 3 shows, in block form, a flow diagram of steps that take place in the practice of this invention. The fuel generation steps predominate in the upper part of the view. The fuel conversion and power generation steps predominate in the lower part of the view.

Sequential steps in the fuel generation part of this invention include (1) TURN ON HIGH CURRENT POWER SUPPLY, (2) START ARC UNDER WATER, (3) FEED CARBON RODS, (4) EVOLVE GASES, (5) COLLECT GASES, (6) FILTER OUT CARBON PARTICLES, (7) COMPRESS FUEL GASES, and (8) STORE COMPRESSED FUEL. The last two mentioned steps are performed upon the evolved, partly reacted, mixture of constituent and by-product gases. Accessory composite steps (9) COOL AND FILTER WATER maintain water conditions as desired, especially at the hot underwater arc locus of gas evolution-from which evolved gases bubble up through the intervening water, heating it, and into the overlying hood, to be drawn off and stored for fuel use as indicated.

Sequential steps in the center of FIG. 3 include arrows and lines from the Store Compressed Fuel step downward to the lower part of the view, and a pair of symmetrically located steps, (16) COMBUST MINORITY OF FUEL (at left) and—at right—(11) COMBUST MAJORITY OF FUEL. Succeeding the latter step are the sequential steps of (12) DRIVE MAJOR GENERATOR, (13) GENERATE EXTERNAL 3$\phi$ AC. A final arrow on the right terminates at (14) EXTERNAL LOADS. To the left from the step (15) COMBUST MINORITY OF FUEL are the sequential steps of (16) DRIVE MINOR GENERATOR and (17) GENERATE INTERNAL AC/DC terminating at (18) INTERNAL LOADS.

Practicing this invention is readily apparent from FIGS. 1 to 3 and the foregoing description. Underwater arcing occurs when an electrical potential (AC or preferably DC) such as common in steel welding is applied across the block electrodes, which preferably are composed essentially of graphite-preferably with a conductive rod (itself mainly carbon) substantially bridging the gap between them.

Precisely what happens in arc-induced decomposition of water is not well understood, though the resulting fuel and its combustion products have been ascertained. To the extent that this specification interprets decomposition or combustion processes, or accounts for the presence of certain products and absence of others, it is to be understood as theoretical or academic rather than definitive.

The mixture of gases so evolved and collected according to the present invention contains (by volume) gaseous hydrogen in major amount, such as from about five to about seven tenths, and carbon monoxide in substantial minor amount, such as from about two to about three tenths. Up to about a tenth to an eighth of the mixture may be made up mainly of carbon dioxide and to a minor extent of gaseous oxygen—the latter in an amount insufficient for the mixture of gases to be self-combustible (rarely more than several percent).

A representative analysis of the fuel gas of this invention can be expected to show about five-eighths gaseous hydrogen, two eighths carbon monoxide, with the rest made up of the other mentioned gases.

Oxides of nitrogen and sulfur common in combustion products of gases from fossil fuels and in hydrogen combustion are missing or minimal because, first, there is no possible source other than air or water and, second, the carbon monoxide content effectively cools and evens out the hydrogen combustion so as to preclude its usual intake valve overheating, plus flashback and hyperoxidative effects.

The carbon dioxide content is held down by substantial absence of hydrocarbons, oils, or other organic chemicals, such as otherwise might combine with the oxygen released by water decomposition in the reactor. The modest amount of resulting gaseous oxygen in the fuel of this invention may have been dissolved in the water initially.

Carbon in the resultant gaseous mixture preferably comes mainly from the rod used to bridge the block electrodes. Alternatively it may be fed to the arc site in particulate form with like effect.

The resulting fuel gas burns upon access to air in effective amount, evenly with substantially clear flame and no sooting. In its gaseous state it can fuel an internal combustion engine without need for an atomizing carburetor or injection nozzle. Such engine may be of jet, piston, turbine, or other type. With an interposed boiler, steam may be generated from water for turbine engine use.

The water to be decomposed in the process of this invention is not subject to any unusual requirement, and most fresh water sources can be expected to prove satisfactory, or salt water can be used. Content of petroleum products or other organic materials should be avoided as they might contaminate the resulting fuel gas.

No unusual materials of construction are needed in apparatus of this invention. The reactor need be only a structurally sound tank, such as steel or other metal, and is preferably grounded. The hood to receive the evolved gases, and the magazine to hold and dispense the rods, are conveniently made of metal, plastic, or ceramic. The magazine may accommodate any convenient number of rods, conveniently loaded upright side-by-side on an inside surface slanting down to an exit directly above the desired electrode-bridging location so as to fed by gravity, although automatic feed may be adopted if preferred.

The rods themselves may be common welding rods, composed mainly of particulate carbon held together by a conventional binder. As also noted, the electrode blocks are solid graphite, also generally available for use in welding and other high-temperature environments and/or high-pressure environments requiring chemical inertness.

The toxicity of carbon monoxide should not pose any problem. Caution is essential in the handling and use of any fuel, so it is expected to be exercised in the instance of this fuel gas as well.

The combustion products of gaseous hydrogen and carbon monoxide are respectively simply water and carbon dioxide, so clean burning is an understandable characteristic of the resulting fuel gas, as is the preference for exclusion of organic materials generally. Other advantages include the fact that water and carbon are relatively low-cost inputs. Similarly, the power required to decompose water is readily available at reasonable cost in at least most locations.

The electrical potential applied across the underwater arc is preferably DC (direct-current) rather than AC (alternating current). Conventional welding equipment operates from standard line-power AC (usually 3-phase) input, and yields a DC or AC output, as desired. For present purposes a DC output of at least several dozens of volts across the electrodes is preferred. External rectification of AC is readily accomplished, as in welding apparatus, for example. AC to DC conversion without moving parts and with an improved output may be accomplished according to Luce U.S. Pat. No. 4,870,558.

If a conventional power source is objectionable because dependent upon fossil fuels, part of the electrical power output can be applied to maintain the arc, and a small part can even be stored, as in a battery or a large capacitor, to restart the arc at any time. Motive means to be actuated by combustion of the fuel, whether directly by resulting temperature increase and associated expansion in volume, or indirectly by conversion of water to steam and similar use of the change-of-state volume expansion, may be conventional. A conventional motor-generator may be used as both motive means and electrical generating means, as its name suggests. Three-phase and single-phase AC motor-generator outputs are available. DC output can be provided by rectifying AC output, preferably without adding moving parts. Motor generators are readily available with multi-phase output (AC). Single-phase AC generators are available, some with optional DC.

The external electrical loads may be any downstream electrical equipment external to the system. The internal electrical loads include the water cooling means, water circulating means, and gas compressing means—and may include the arc as well, once the arc is operating so as to make the system self-contained.

It should be understood that this invention provides a key to unlocking stored chemical energy by applying considerable electrical energy for a very short time and a smaller amount for a much longer time, and by adding chemical energy in the form of cheap carbon, air, and water to obtain more (and more valuable) electricity. This method should not be understood as violating any accepted scientific principle, but only as applying science to economic advantage, as facilitated by the negative voltage coefficient of electric arcs.

The accepted view of internal combustion engines as inefficient should be substantially redirected to the combustion inefficiency of fossil fuels. The fuel of the present invention greatly improves engine operation and benefits the environment by absence of the customary polluting emissions. These benefits are attributable mainly to the increased efficiency of combustion of this fuel supplemental to the minimal power requirement for converting inexpensive input materials into the fuel itself.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

I claim:

1. Method of generating electrical power from fuel combustion, comprising the steps of
    operating motor-generator apparatus, including internal-combustion means and electrical-generating means, with compressed fuel comprising by volume about five-tenths to about seven-tenths hydrogen and about two-tenths to about three-tenths carbon monoxide,
    including combusting the fuel substantially entirely to water and carbon dioxide in the internal-combustion means to drive the electrical-generating means.

2. Method according to claim 1, including the steps of deriving the fuel from water by operating an underwater carbon arc, evolving and collecting the fuel therefrom in gaseous form;
    feeding the fuel to the motor-generator's internal-combustion means along with sufficient air to combust the fuel,
    so operating the internal-combustion means to drive the electrical-generating means; and
    generating electrical output power with the electrical-generating means.

3. Method according to claim 2, including feeding carbon to the arc during operation, in accordance with consumption thereof.

4. Method according to claim 3, including the steps of compressing and storing for future use fuel so collected, and recirculating some water from the vicinity of the arc through a filter to clean it and through a heat exchanger to cool it.

5. Method according to claim 4, including the steps of using minor amounts of the generated electrical power to perform the fuel compressing and storing steps and the water recirculating step.

6. Method according to claim 2, including the step of striking the arc initially from an external source of electrical power.

7. Method according to claim 6, including the step of maintaining the arc with a minor amount of the generated power.

8. Electrical power generating system comprising
fuel combustion means adapted to intake air and air-combustible fuel and to combust the fuel with the air and in so doing to emit water and carbon dioxide and to actuate associated motive means adapted to drive interconnected electrical generating means;

motive means associated with the fuel combustion means and actuated by the combustion thereof to drive the generating means;

electrical generating means mechanically connected to the motive means and thereby adapted to be driven thereby to generate electrical power as the output of the generating means; and fuel-evolving means comprising an underwater arc having carbon electrodes and adapted to evolve fuel comprising about five-eighths hydrogen and about three-eighths carbon monoxide by volume, plus fuel-compressing means adapted to provide the combustion means with said compressed fuel, air-combustible without harmful emissions.

9. Electrical generating energy-conversion method, comprising supplying a container with water, immersing in the water in the container carbon electrodes adapted to arc therebetween when sufficient electrical potential is applied thereacross, placing gas-collection means over the carbon electrodes and extending below the water surface in position to receive gas evolved incident to decomposition of water by operation of the electric arc;

applying across the carbon electrodes an electrical potential effective to decompose water into its component gases, hydrogen and oxygen and to oxidize carbon, thereby evolving hydrogen in major part and carbon oxides in substantial minor part, mainly carbon monoxide and partly carbon dioxide;

collecting and storing the evolved gases under pressure;

feeding the evolved gases as fuel along with air to combustion means adapted to combust hydrogen to water and carbon monoxide to carbon dioxide and thereby to raise their temperature and to expand their volume;

operating motive means with the heated and expanding gases;

driving electrical generating means with the motive means and thereby generating useful electrical output.

10. Energy conversion method according to claim 9, including applying part of the generated electrical output to the carbon arc electrodes, and thereby enabling continued operation of the arc and the rest of the method independently of external power sources once the arc has been struck and electrical output has been generated.

11. Energy conversion method according to claim 10, including storing part of the generated electrical output in suitable means from which it can be recovered at will.

12. Energy conversion method according to claim 14, including applying the stored electrical output to the carbon arc electrodes, and thereby re-initiating the arc after any discontinuation thereof.

* * * * *